United States Patent Office 3,555,922
Patented Jan. 19, 1971

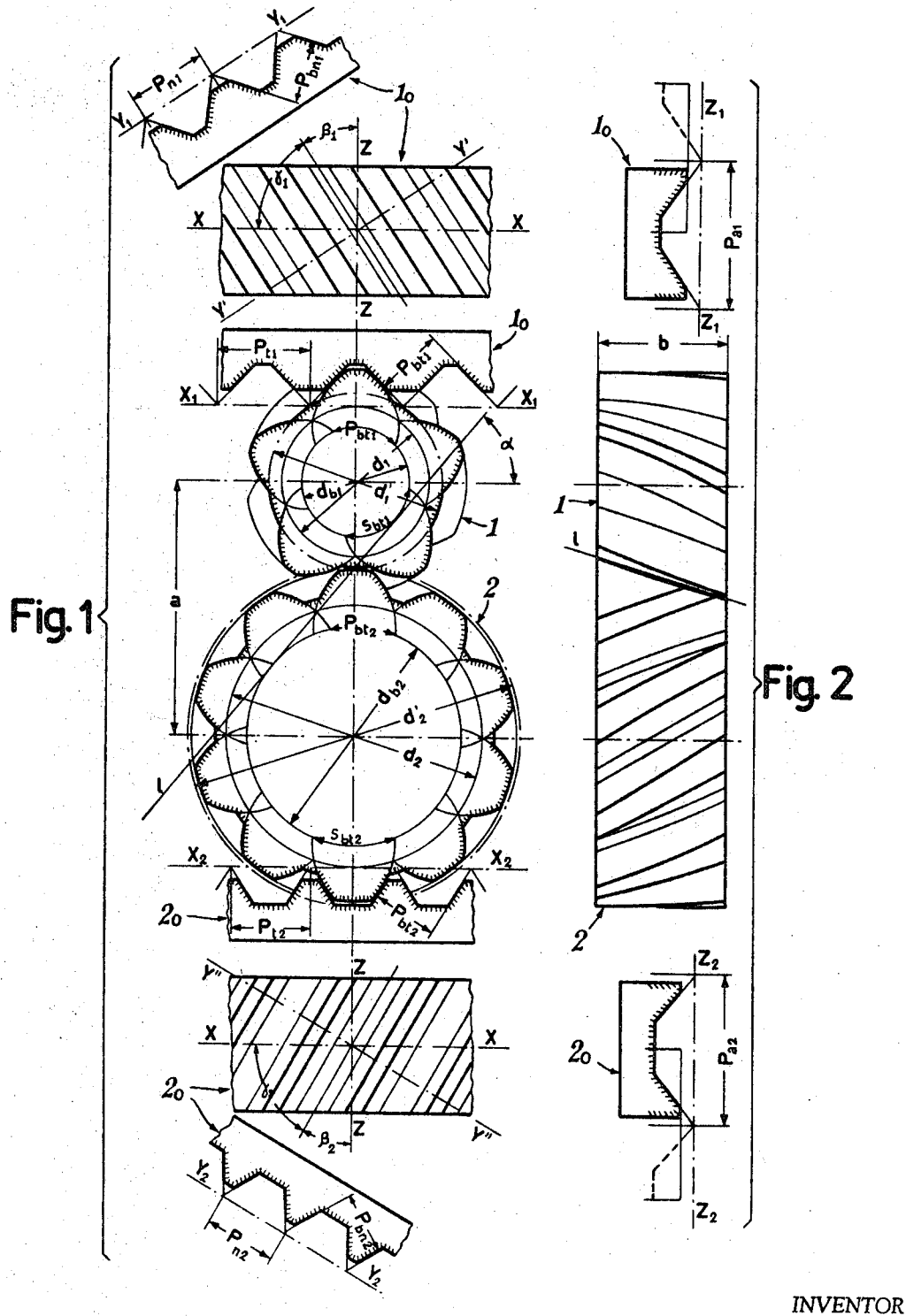

3,555,922
HIGH EFFICIENCY, REVERSIBLE OR IRREVERSIBLE GEAR PAIRS WITH PARALLEL AXES SUITABLE TO PROVIDE HIGH GEAR RATIOS, WITH SMALL CENTER DISTANCE
Roberto Preti, Naples, Italy, assignor to H.S.G. S.p.A., Naples, Italy
Filed Feb. 7, 1969, Ser. No. 797,502
Claims priority, application Italy, Feb. 21, 1968, 832,341/68
Int. Cl. F16h 55/04
U.S. Cl. 74—458       7 Claims

ABSTRACT OF THE DISCLOSURE

Gear pairs with parallel axes consisting of internal or external toothed gears with straight, or helical or double-helical teeth with involute transverse tooth profile, each of said gears and any number of teeth thereof satisfying the conditions as follows: (a) the normal (or transverse) base width is greater than, or at least equal, to the normal (or transverse) base pitch; (b) a real or imaginary cylindrical surface exists—which is, by definition, the reference cylinder of the considered gear—whereon the normal (or transverse) tooth thickness will be equal to the normal (or transverse) pitch; (c) the usable flank which is the active flank of the tooth is the entire flank, and the entire flank lies on an involute helicoid.

---

In this specification, only terms, definitions and symbols proper of the gear will be used, as reported in the UNI table 4760 P "Ruote Dentate: Termini e Definizioni" and in the corresponding recommended rules ISO No. 888 "Vocabulaire Internationale des Engrenages; Symboles de Données Géométriques" and ISO 889 "Notation Internationale des Engrenages—Symboles de Données Géométriques."

For the sake of clearness, the following specification will be arranged under headings as follows: (1) kinematic and dynamic characteristics; (2) advantages; (3) geometrical elements characteristic of the teeth; (4) generation of the teeth; basic rack and counter part rack; (5) conditions of engagement; (6) practical gear-cutting processes.

FIG. 1 illustrates a lateral view of gears made according to the invention, as described below, and;
FIG. 2 is an end view thereof.

(1) Kinematic and dynamic characteristics.—The gears forming the subject-matter of the present invention consists of gear pairs with parallel axes, toothed internal or external, with involute tooth profile, of the types spur, helical, and double-helical.

Said gears are mainly characterized in that:
 (a) All the tooth is, in each gear, external to the reference cylinder;
 (b) The pitch cylinder of the driving gear is within the root cylinder of its teeth.

When the aforesaid systems of notation are applied, gears having the characteristics as above can be classified as "$0.x=0$ gears" and thus they will be indicated in this specification.

It is to be understood that in the term $0.x=0$ the first 0 means the definition of the standardized datum plane of the basic rack—which for the gears in question is the plane of the basic rack wherein the ratio tooth thickness/pitch is equal to zero—the subsequent symbol $x=0$ meaning the normalized value of the addendum modification coefficient, which for the gears in question is equal to zero.

Due to the aforesaid characteristics, the $0.x=0$ gears differ from the conventional types by the contact limited to the recess contact, by exceptionally high values of the relative radius of curvature, and by the high speed of unidirectional sliding of the mating surfaces.

(2) Advantages.—Due to said characteristics, the gears according to the present invention, allow with respect to the conventional gears, a reduction of the center distance and therefore of the total space required by the pair, at parity of horsepower and of angular speed, and have singular properties some of which will be specified hereinafter:

(a) Simplicity of design.—Practical desing of a $0.x=0$ gear pair requires only a few elementary calculations as the tooth profile and proportions are strictly geometrically obtained, so that no correction or modification of the theoretical profile is ever needed.

(b) Economy of manufacture.—The gear-tooth cutting, and the eventual grinding, of these gears can be effected with the conventional gear-machines and also by systems which are far simpler and more economical, since it is possible, as it will be seen hereinafter, to cut and to grind teeth having any module, by a common tool (for instance a disk-type milling cutter).

(c) Wide field of use.—The gear ratio of a $0.x=0$ pair is independent of the average diameters of the teeth of the two gears; and the resultant freedom in selecting the more convenient center distance can solve the most severe problems of a drive between parallel axes.

(d) Smaller number of teeth.—While in the conventional gears, it is hardly possible to find pinions, even with modified teeth, having less than seven teeth, the minimum number of teeth for a $0.x=0$ pinion is 1 (for helical gears). This characteristic provides the means of designing pinions of high load capacity on the smallest diameters, and it makes practical the construction of a single gear pair drive with a high gear ratio and limited dimensions.

(e) A greater load capacity.—The load capacity of the $0.x=0$ gears is greater than that of the conventional gears. This is due mainly to the fact that when the gears are desinged, the position of the path of contact, with respect to the pitch cylinders, can be so selected that the relative radius of curvature will be near to the peak value.

(f) Higher efficiency.—The efficiency of the $0.x=0$ gears is greater than that of the corresponding conventional pairs (as has been experimentally determined); however, the Reynold effect, due to high unidirectional sliding speed and a better distribution of the pressure between the mating surfaces (due to the aforesaid greater relative radius of curvature), greatly improves the conditions of lubrication, giving great promise of better efficiency.

The $0.x=0$ gears also make possible special drives, namely:

(g) The gearing-up drive with high gear ratio.—As it is known, great difficulties are met when gearing-up drive with high gear ratio is attempted with conventional gears. On the contrary, in the $0.x=0$ gears, by the great latitude in selecting the contact position said difficulties are avoided and it will be possible to obtain gearing-up drives with an efficiency comparable with that of the best conventional reduction drives.

(h) The irreversible drive.—A particular design achieves the self-locking condition and while, as it is known, the worm and worm wheel drive achieves this condition with an efficiency lower than 0.5, the $0.x=0$ gear achieves the self-locking condition between *parallel axes* with a far greater efficiency on the direct motion.

The above characteristics result in an operating economy, due to the high efficiency, and also a reduction of the production costs:

(a) Due to use of less expensive tools; (b) due to the fact the tooth modification is dispensed with; (c) due to the reduced dimensions and weight of the gears when horsepower, speed and ratio are given; (d) due to the reduction of the time required for the teeth generation, as a result on the one hand of the simplification of the cutting and grinding systems, and on the other change of the smaller number of teeth to be generated.

Also the relevant possibilities for mechanical applications must be taken into consideration, namely:

(a) The remarkable reduction of the moment of inertia of the pair: in fact a $0.x=0$ wheel, with the same face-width, gear ratio, and the dimensions of the mating pinion, can have a moment of inertia 250 times less than that of the conventional equivalent wheel.

(b) The possibility of varying within wide limits the gear ratio, maintaining the *same center distance,* and with the substitution of *only one* of the gears forming the pair.

(c) The practical possibility of achieving high gear ratios with a single pair: the replacement of a train of gears by a simple pair is convenient not only due to the reduced manufacturing cost, to the lower weight and encumbrance, or for the greater efficiency, but also due to greater reliability of service as the gear-tooth load will be reduced to a maximum value equalling that of the first driving gear of the train of gears.

(3) *Geometrical elements characteristic of the teeth.*— The characteristics of the $0.x=0$ gears and the possibilities afforded thereby, as they have hereinbefore been listed, depend upon the positions that the teeth of the $0.x=0$ gear pair will take with respect to the pitch cylinders, and said positions can be selected depending upon the kinematic and dynamic characteristics which are to be achieved in the gear pair (value and sign of the sliding speed between the mating surfaces, position and more or less extended limitation of the recess contact, value of the ratio of the average diameters of the teeth in respect of the gear ratio, value of the relative radius of curvature, irreversibility, efficiency, etc.).

For whatever position is taken by the teeth of a $0.x=0$ gear with respect to its pitch cylinder, in the $0.x=0$ gear pair—besides the already pointed out features and characteristics—some singular geometrical properties of the teeth will remain unchanged.

The geometrical properties of the teeth of the $0.x=0$ gears are three and are rigorously defined, both as therefrom depend the aforesaid kinematic and dynamic characteristics, and as they are easily recognizable in the gears and in their basic racks.

The first geometrical property of the teeth of the $0.x=0$ gears consists in that, on the reference cylinder of each gear, the normal (or transverse) tooth thickness, is always equal to the normal (or transverse) pitch.

The second geometrical property of the teeth of the $0.x=0$ gears consists in that in each gear the normal (or transverse) base width of the tooth is greater than the normal (or transverse) base pitch, and at the limit equal, according to whether the reference cylinder is greater than the base cylinder, or at the limit, is coincident therewith.

The third geometrical property of the teeth of the $0.x=0$ gears is a direct consequence of the first cited two properties, and consists in that the flank usable as the active flank is the entire flank; so that practically it will be possible to achieve toothed gears having a small number of teeth without undercutting and consequent modification of the profiles.

The fundamental properties of the $0.x=0$ gears, as well as those of their teeth, as aforesaid, can be detected in the attached drawing showing a $0.x=0$ gear pair in its front view, FIG. 1, and in its side view, FIG. 2. In the front view of FIG. 1, in order to enhance the representation of the gear pair, the peripheral lines defining materially the profile of the two gears have been shown in dotted line—details 1 and 2 of the attached drawing—on said gears have been superposed the geometrical elements proper of that pair with the symbols pertaining thereto.

Said symbols, which when related to the pinion have the subscript 1, and when related to the wheel have the subscript 2, are:

$a$=center distance; $b$=facewidth; $l$=line of action; $\alpha$=transverse pressure angle; $p_t$=transverse pitch; $p_{bt}$=transverse base pitch; $d$=reference diameter; $d'$=pitch diameter; $d_b$=base diameter; $s_{bt}$=transverse base width.

Also in order to permit the illustration of the principle of $0.x=0$ gear-tooth generation; to the gears 1 and 2 have been added the respective counterpart racks, details Nos. $1_o$ and $2_o$ of the attached drawing. Said racks serve the purpose of generating the gear, but of course they do not comprise a part thereof. The counterpart racks are shown in the attached drawing in the usual representations: top view, in a cross sectional view XX corresponding to a plane perpendicular to the axes of the gears, in the sectional view ZZ corresponding to a plane containing the axes of the gears, and in the cross-sectional views Y′Y′ and Y″Y″ corresponding to the planes normal to the flanks of the teeth of the two racks respectively.

Also the counterpart racks have been dotted in their profiles, in order to distinguish them from the basic racks; as hereinafter defined, wherein said counterpart racks are inscribed. Passing through the vertices of the outer angles (of the sections) of the two basic racks there have been dotted the lines $\overline{X_1X_1}$, $\overline{Y_1Y_1}$, $\overline{Z_1Z_1}$ and $\overline{X_2X_2}$, $\overline{Y_2Y_2}$, $\overline{Z_2Z_2}$. Said dotted lines show the intersections of the datum planes of the basic racks with the sectional planes XX, ZZ, Y′Y′, Y″Y″ as above defined.

The dimensions of the counterpart racks (and the basic racks) have been shown in the drawing with the symbols of the associated gears, to demonstrate the correspondence of said dimensions in the gear and in the respective rack (either counterpart, or basic). Said symbols which have the subscript 1 if related to the counterpart rack $1_o$ (of the pinion 1) and the subscript 2 if related to the counterpart rack $2_o$ (of the wheel 2) are: $\gamma$=lead angle; $\beta$=helix angle; $p_n$=normal pitch; $p_a$=axial pitch; $p_{bn}$=normal base pitch.

It should be noted that said drawing is only a non limitative example, as the above defined geometrical properties are found in the $0.x=0$ gears for any number of teeth, for any center distance, for any gear ratio, and for any lead angle of the teeth, both in the internal gears and in the external gears.

(4) Generation of the teeth: basic rack and counterpart rack.—With reference to the above described drawing, the basic rack of the $0.x=0$ gear will be hereinafter defined and the principle on which the generating process of the teeth is based, will be described.

The basic rack of the $0.x=0$ gear (details $1_o$, $2_o$ of the attached drawing) consists of an infinite series of plane flank teeth, superposable by rectilinear translation, the profiles of which, in the cross section perpendicular to the flanks and in other sections, are equal isosceles triangles.

In said basic rack the datum plane is so defined that the ratio of the tooth thickness to the pitch has a standard value equal to zero: i.e. the datum plane of the basic rack of the teeth $0.x=0$ always passes through the outer edges of its teeth (see in the attached drawings the dotted straight lines $\overline{X_1X_1}$, $\overline{Y_1Y_1}$, $\overline{Z_1Z_1}$ and $\overline{X_2X_2}$, $\overline{Y_2Y_2}$, $\overline{Z_2Z_2}$ representing the traces of the datum planes of the basic racks $1_o$ and $2_o$ in the three above defined sections).

When theoretically or actually the $0.x=0$ teeth are to be generated, said datum plane of the basic rack retains the given lead angle, tangent to the reference cylinder, and moves therewith with no sliding.

The above description is completed by stating that: (a) the lead angle of the teeth of the basic rack can be defined only with reference to the rack-gear contact and is represented by the angle which the generating straight lines of the flanks of the teeth, which are all parallel to the tangent to the reference helix of the gear, form with a plane normal to the axis of the gear (see angle $\gamma_1$ and $\gamma_2$ in the details $1_o$ and $2_o$ of the attached drawing); (b) the reference cylinder of the teeth of $0.x=0$ gears (see the $d_1$ and $d_2$ diameter cylinders in details 1 and 2 of FIG. 1 of the attached drawing) is by definition: see the fourth paragraph under heading 3 above, beginning "The first geometrical property of the $0.x=0$ gears") the cylindrical surface whereon the normal (or transverse) tooth thickness is equal to the normal (or transverse) pitch; (c) the average diameter of the teth of a $0.x=0$ gear is the diameter of the circle along which the tooth thickness equals the tooth space; (d) the basic rack of a $0.x=0$ internal gear, must be considered connected, as above described, to the reference cylinder of a $0.x=0$ external gear, which fits perfectly (as groove and tongue) the considered internal gear (this is obviously due to the fact that it being impossible to generate an involute inside the base circle, the involutes forming the profiles of the teeth of an internal gear must be originated by a base circle having a diameter less than that of the tip cylinder of the considered gear); (e) the counterpart rack of a gear is the rack which can engage the basic rack of the considered gear so that its usable flanks will be coincident with the flanks of the basic rack, and that its tip will be turned towards the outer edges of the basic rack.

(5) Conditions of engagement.—Two $0.x=0$ gears form a $0.x=0$ gear pair when they are conjugated. In order that two $0.x=0$ gears will be conjugated it will be necessary and sufficient that they will have: (a) equal base pitch; (b) base helix angles equal and opposite.

The conditions necessary for the engagement do not include limitations on the (normal or transverse) pitches and angles of the reference helix or of the pitch helix. By the definition of the characteristics of the $0.x=0$ gears (see heading 1, subheads (a) and (b)) the condition has been implicitly imposed that the normal (or transverse) pitch of the driving gear will be always greater than, or at least equal to, the corresponding pitch of the driven gear. This condition, which is absolutely arbitrary, has been imposed as gears that differ therefrom would have little practical interest.

The conditions necessary and sufficient for the engagement, as they have been hereinbefore reported under points (a) and (b) should be widely analytically treated, but as the discussion of the theory of the $0.x=0$ gears would be arduous and unncessary in this specification, hereinafter will be disclosed directly those results from which it is possible to obtain the elements necessary for the generation of the $0.x=0$ gears.

Taking into account also the known conventional theory of the involute gears, it is stated that: two $0.x=0$ gears will correctly engage when they have the equal base pitch and when, *satisfied by another way the continuity of motion*, it will be verified that the quotient of the cosine of the lead angle and the normal pitch, on the reference cylinder, has the same value in both gears. Therefore in the spur gears, the cosines of the lead angles being equal to zero the ratio between the normal (or transverse) pitches on the reference cylinders, is indeterminate.

When the above conditions occur (corresponding to those occurring also in the helical gears in any cross section perpendicular to their axes) it will be easily ascertained that two spur gears having only their base pitches equal are conjugated.

It is to be noted that in the attached drawing the common tangent to the base circles of the gears, intersects the line of the centers at a point which, due to obvious geometrical considerations, is the "pitch point." As said common tangent is also the common perpendicular to the involutes at the contact point, the profiles of the teeth will be conjugated.

It is to be noted that by departing from the conventional condition of equality of pitch and lead angle on the pitch circles, it occurs that normally the shortest length between the opposite transverse profiles of the tooth of a gear, when gauged on the pitch circle of the gear itself, has a value far different from the corresponding value of the mating gear.

In order to give a clear explanation of the phenomenon, said distance must be considered positive if the pitch circle is inside the circumference, concentric therewith, passing through the first intersection point of the profiles of the tooth (reference circle), and negative in the contrary case (pitch circle outside said circumference).

By such a convention, in fact, the algebraical sum of the values of said distances, either gauged or deduced on both gears, will be equal to the transverse pitch, either gauged or calculated, on the pitch circles of the gear pair.

The differences of pitch and lead angle, which are found in the mating $0.x=0$ gears, make it necessary to generate each $0.x=0$ gear pair, using two counterpart racks wherein must be reproduced the same conditions which differentiate the mating gears.

In order that two $0.x=0$ gears are conjugated, it is therefore necessary and sufficient that the respective basic racks will have: (a) an equal distance between the parallel and congruent flanks of two adjacent teeth; (b) opposite inclinations of the teeth having such a value that in each of them the quotient of the inclination cosine and the normal pitch, will be equal.

The above conditions can be symbolically set out by the relationships:

(a) $p_{bn1}=p_{bn2}$; (b) $\cos \gamma_1/p_{n1} = \cos \gamma_2/p_{n2}$ (6) Practical gear-cutting processes.—For generating the teeth of the gear each basic rack must be coupled to its gear, in the manner specified in heading 4 of this specification, carrying the datum plane of the basic rack to become tangent to the reference cylinder which, together with the other elements, will be determined by the design calculation.

In order to allow persons skilled in this art to verify the validity of this method, after the construction of two counterpart racks wherein the above (a) and (b) conditions occur, it is possible to generate the teeth with the modalities as specified in heading 4 subhead III, carrying the datum plane of each rack to be tangent to that cylinder the diameter $d$ of which satisfies the relation $\pi d = z p_t$, where $z$ is the number of teeth provided for the considered gear.

It is obvious that the generation of the gears, when empirically carried out, even if it is capable of supplying as a result a conjugated pair, produces a $0.x=0$ gear pair with characteristics which can not be anticipated.

The generating process of the $0.x=0$ gears can be practically carried out not only using usual gear-cutting machines, but also applying systems which substantially will reproduce on the machine-tool the generation of the teeth within the envelope of the tangent planes to the involute helicoid forming the flank of the tooth. By the application of this system all of the $0.x=0$ gears can be generated by disk-type milling cutters (and ground by disk grinders) or by tools which will produce by their motion relative to the gear, equivalent conditions.

Finally attention is called to the fact that the $0.x=0$ gears cannot be considered special gears as by the use of them it is possible to realize gear members of intermating series.

Having thus described the present invention, what is claimed is:

1. Gear pairs with parallel axes consisting of driving and driven toothed gears with teeth having an involute transverse tooth profile, the teeth being characterized by
   (a) a normal or transverse base having a width greater than the normal or transverse base pitch;
   (b) a normal or transverse tooth thickness, on the reference cylinder of the considered gear, equal to the normal or transverse pitch; and
   (c) an active tooth flank which is the entire flank and which lies on an involute helicoid.

2. Gear pairs as claimed in claim 1, the teeth being further characterized in that
  (d) the normal or transverse pitch of the driving gear, gauged on the reference cylinder, has a value greater than that of the corresponding driven gear;
  (e) the reference helix angle of one gear has a value selected with respect to that of the mating gear to have in each of them an equal quotient between the reference helix angle cosine and the reference normal pitch; and
  (f) the shortest length between the opposite transverse profiles of the tooth of a gear on the pitch circle thereof is different from the corresponding length of the mating gear; and the algebraical sum of said lengths, when considering positive the value of said distance if internal to the reference circle passing through the points of the first intersections of the involutes forming the profiles of the teeth and negative if external to said reference circle, being equal to the transverse pitch on the pitch circles of the gear pair.

3. Gear pairs as claimed in claim 2, wherein the position of the path of contact is such, with respect to the pitch cylinders, that the relative radius of curvature is near to peak value, whereby both the load capacity and efficiency of the gears is increased and the distribution of the pressures between the mating surfaces is improved.

4. Gear pairs as claimed in claim 1, wherein
  (d) the pitch cylinder of the driving gear is internal with respect to the root cylinder of the teeth of the considered gear; and
  (e) the ratio between the number of the teeth of the driving gear and the number of teeth of the driven gear is greater than the corresponding ratio between the average diameters of the teeth of the two gears.

5. Gear pairs as claimed in claim 1, wherein the driving gear shaft is movable in both directions under the influence of torque applied thereto but the driven gear shaft is motionless in both directions under the influence of torque applied thereto.

6. Gear pairs as claimed in claim 1, each of the gears being conjugated with a basic rack, said racks being different from one another and characterized in that
  (i) the length between the parallel and congruent flanks of two adjacent teeth has the same value in both racks;
  (ii) the generating lines of the teeth have opposite inclinations with an inclination angle such that in each rack the quotient of the cosine of said inclination angle and the normal pitch is equal; and
  (iii) the normal or transverse pitch is smaller than the normal or transverse pitch of the corresponding gear gauged on any cylinder included between the root cylinder and the tip cylinder of the considered gear.

7. Gear pairs as claimed in claim 1, wherein the gear teeth are disposed entirely outside of the pitch cylinders to limit the contact surface only to the recess surface and to allow a reduction of the center distance and therefore of the total encumbrance of the gear pair at parity of horsepower and of angular speed.

References Cited
UNITED STATES PATENTS
3,220,279   11/1965   Dareing _____ 74—462
3,247,736   4/1966   Roth _____ 74—462

LEONARD H. GERIN, Primary Examiner